US011489743B1

(12) United States Patent
Gupta

(10) Patent No.: US 11,489,743 B1
(45) Date of Patent: Nov. 1, 2022

(54) ANOMALY DETECTION FOR MULTIVARIATE METRICS IN NETWORKS

(71) Applicant: Arista Networks, Inc., Santa Clara, CA (US)

(72) Inventor: Karan Gupta, Dehradun (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/477,736

(22) Filed: Sep. 17, 2021

(51) Int. Cl.
*H04L 43/065* (2022.01)
*H04L 43/067* (2022.01)
*G06N 20/00* (2019.01)
*H04L 43/0817* (2022.01)
*H04L 41/0604* (2022.01)

(52) U.S. Cl.
CPC .......... *H04L 43/065* (2013.01); *G06N 20/00* (2019.01); *H04L 41/0627* (2013.01); *H04L 43/067* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 2009/0138616 | A1* | 5/2009 | Alvarez | H04L 43/00 709/235 |
| 2011/0276490 | A1* | 11/2011 | Wang | G06Q 10/00 705/317 |
| 2017/0353991 | A1* | 12/2017 | Tapia | H04L 41/147 |
| 2018/0136863 | A1* | 5/2018 | Barajas Gonzalez | G06F 3/067 |
| 2018/0308002 | A1* | 10/2018 | Kurian | G06F 11/00 |
| 2018/0316588 | A1* | 11/2018 | Miernik | H04L 43/16 |
| 2019/0102693 | A1* | 4/2019 | Yates | G06N 5/003 |
| 2019/0239158 | A1* | 8/2019 | Wulff | H04W 48/20 |
| 2019/0335345 | A1* | 10/2019 | Yan | H04W 16/18 |
| 2020/0034665 | A1* | 1/2020 | Ghanta | G06N 20/00 |
| 2021/0021533 | A1* | 1/2021 | Guim Bernat | H04L 47/746 |
| 2021/0027205 | A1* | 1/2021 | Sevakula | G06F 11/327 |
| 2021/0192280 | A1* | 6/2021 | Zhang | G06N 20/20 |
| 2021/0391079 | A1* | 12/2021 | Clifton | G16H 50/20 |
| 2021/0400758 | A1* | 12/2021 | Kao | G06N 20/00 |
| 2022/0036214 | A1* | 2/2022 | Venugopal | G06N 5/04 |
| 2022/0070068 | A1* | 3/2022 | Earhart | H04L 41/5025 |
| 2022/0092473 | A1* | 3/2022 | Lee | G06K 9/6256 |

* cited by examiner

*Primary Examiner* — Joshua Joo
(74) *Attorney, Agent, or Firm* — Fountainhead Law Group P.C.

(57) ABSTRACT

A method of managing communication services provided by a service provider, comprising obtaining a prediction of a portion of the quantity of the served devices that received substandard communication services from the service provider during a period of time, obtaining an acceptable deviation from the prediction of the portion of served devices, making a determination that a quantity of the served devices that received substandard communication services from the service provider during the period of time is outside of a range, and performing an action set to initiate remediation of the service provider. Specifically, the determination is based on the prediction of the portion of the quantity of served devices, and the acceptable deviation.

20 Claims, 8 Drawing Sheets

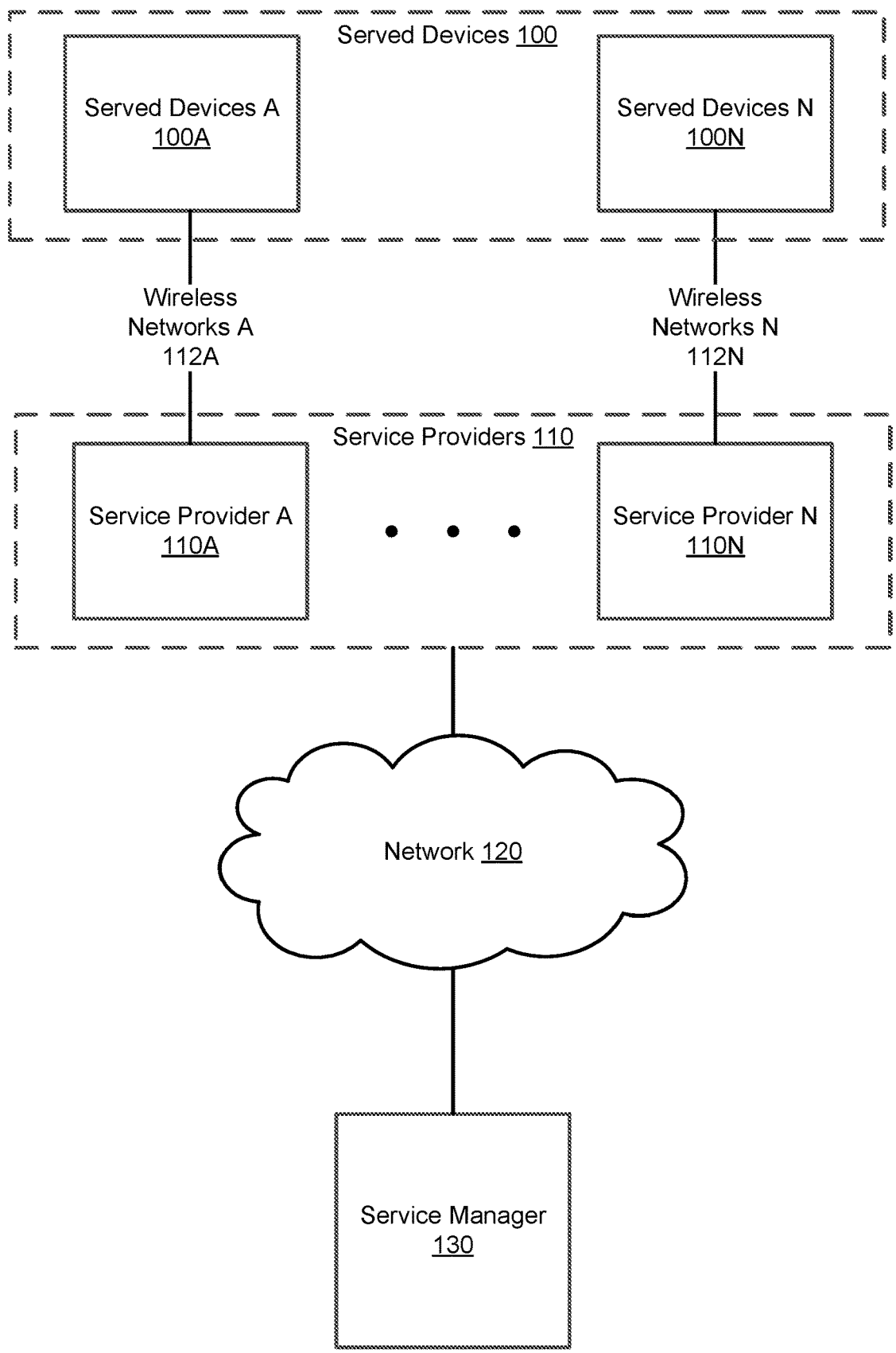
FIG. 1.1

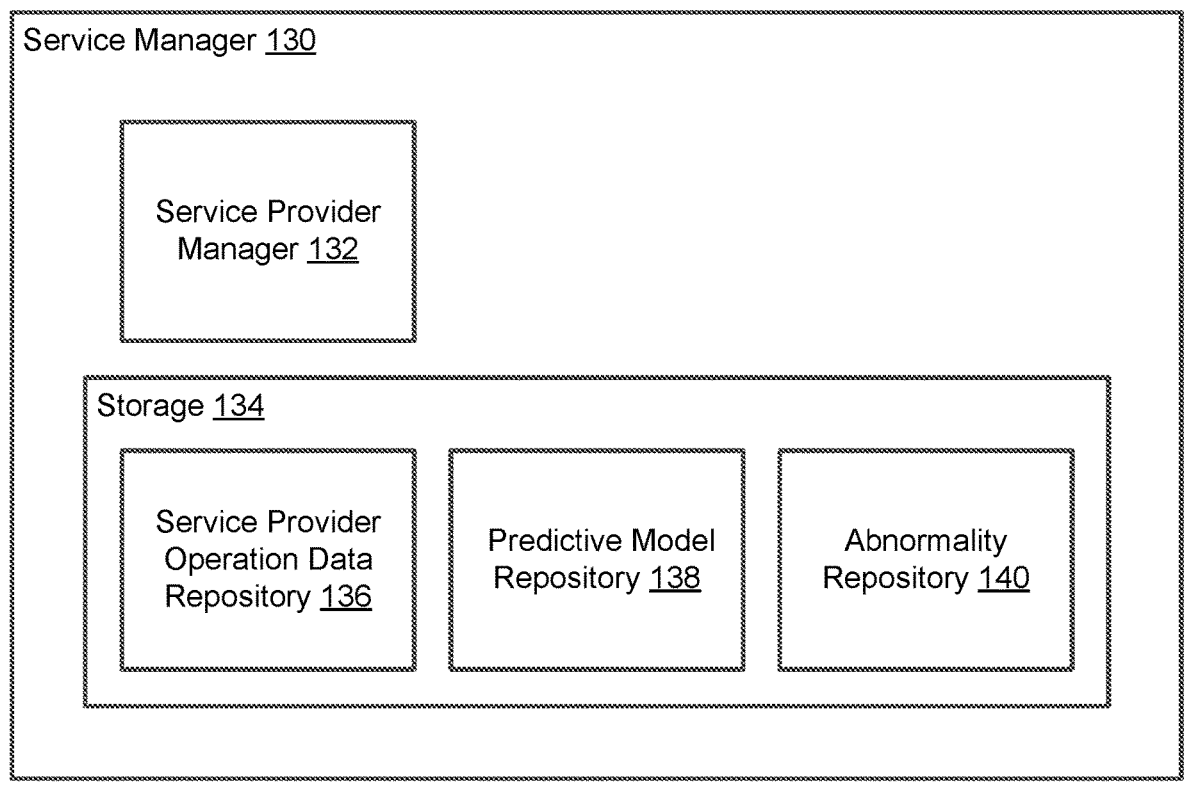
FIG. 1.2

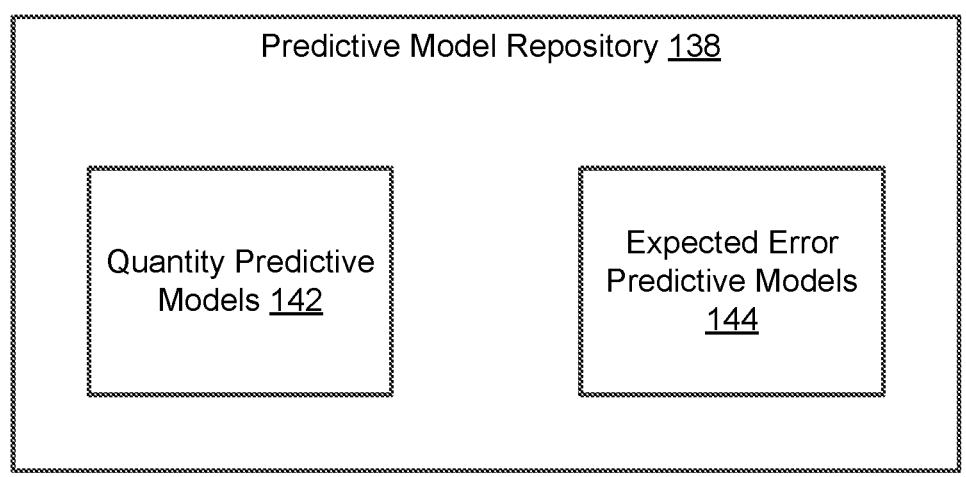
FIG. 1.3

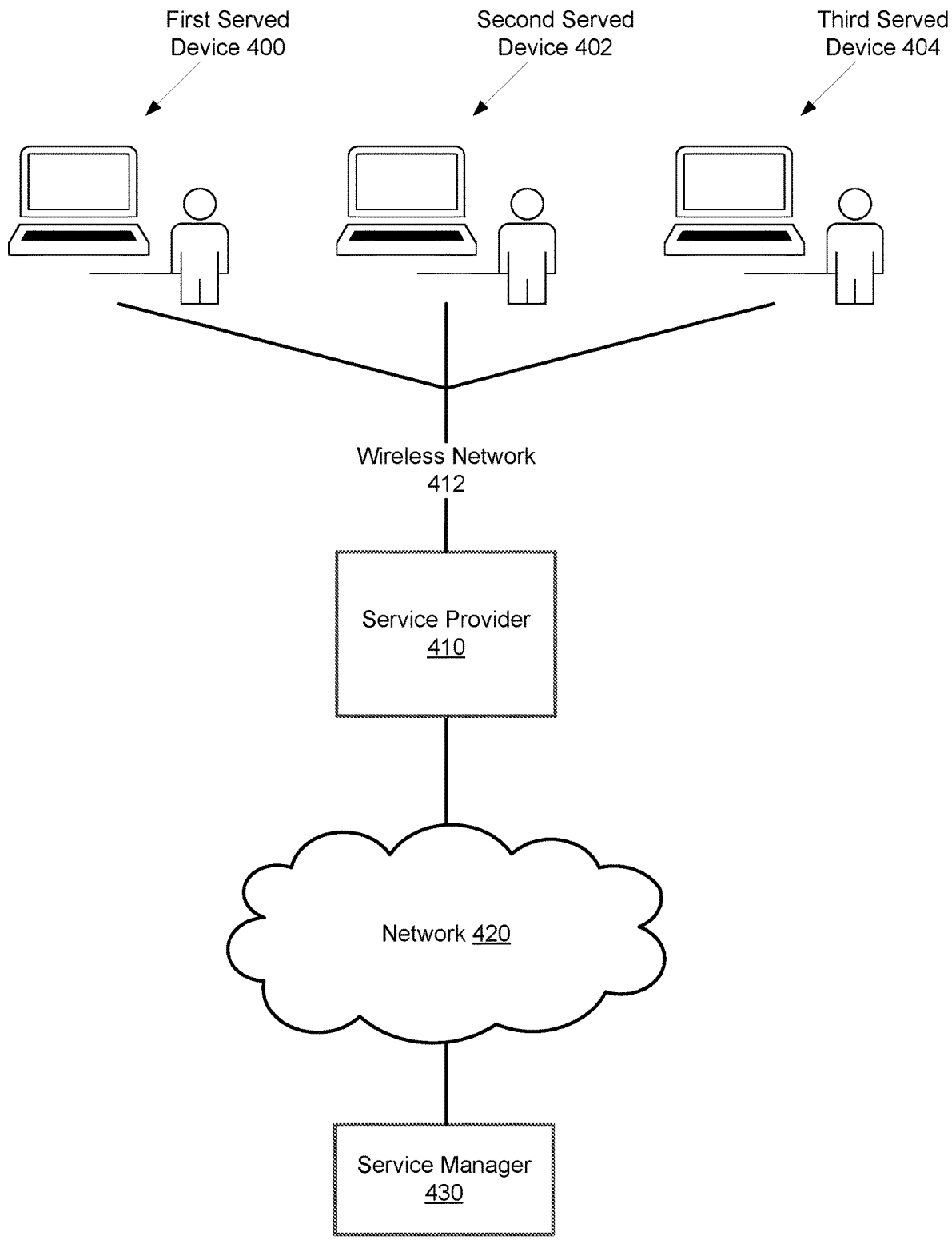
FIG. 4.1

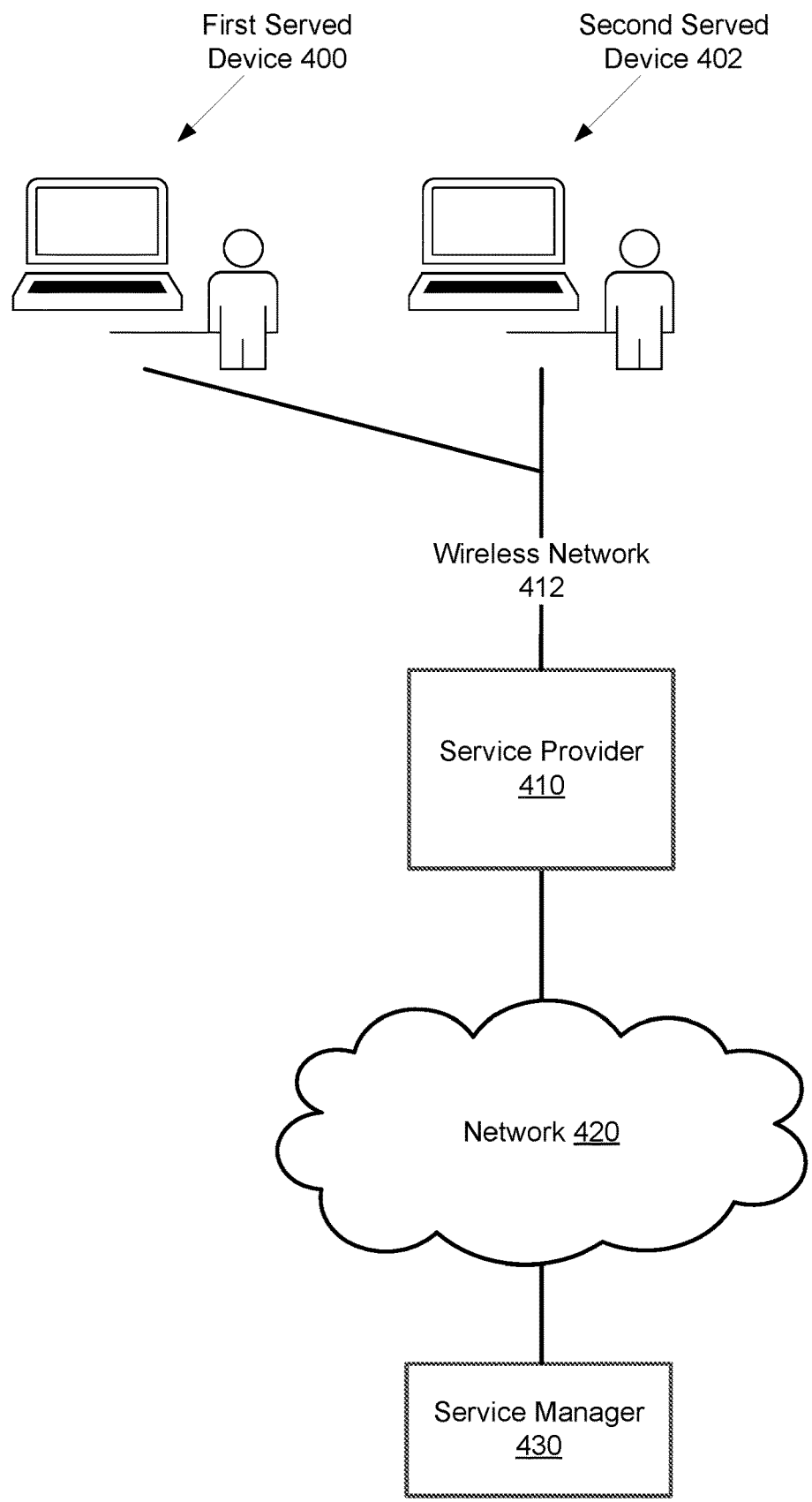
FIG. 4.2

ANOMALY DETECTION FOR MULTIVARIATE METRICS IN NETWORKS

BACKGROUND

Multiple devices may communicate with each other to provide their respective functionalities. For example, the devices may send data representing information necessary for the multiple devices to provide their functionalities. If devices are unable to communicate with one another, the respective devices may be unable to provide all, or a portion, of their respective functionalities.

BRIEF DESCRIPTION OF DRAWINGS

Certain embodiments will be described with reference to the accompanying drawings. However, the accompanying drawings illustrate only certain aspects or implementations of the disclosed embodiments by way of example and are not meant to limit the scope of the claims.

FIG. 1.1 shows a diagram of a system in accordance with one or more embodiments disclosed herein.

FIG. 1.2 shows a diagram of a service manager in accordance with one or more embodiments disclosed herein.

FIG. 1.3 shows a diagram of a predictive model repository in accordance with one or more embodiments disclosed herein.

FIG. 4.1-4.2 show diagrams of the operation of an example system over time in accordance with one or more embodiments disclosed herein.

DETAILED DESCRIPTION

Figure 2:
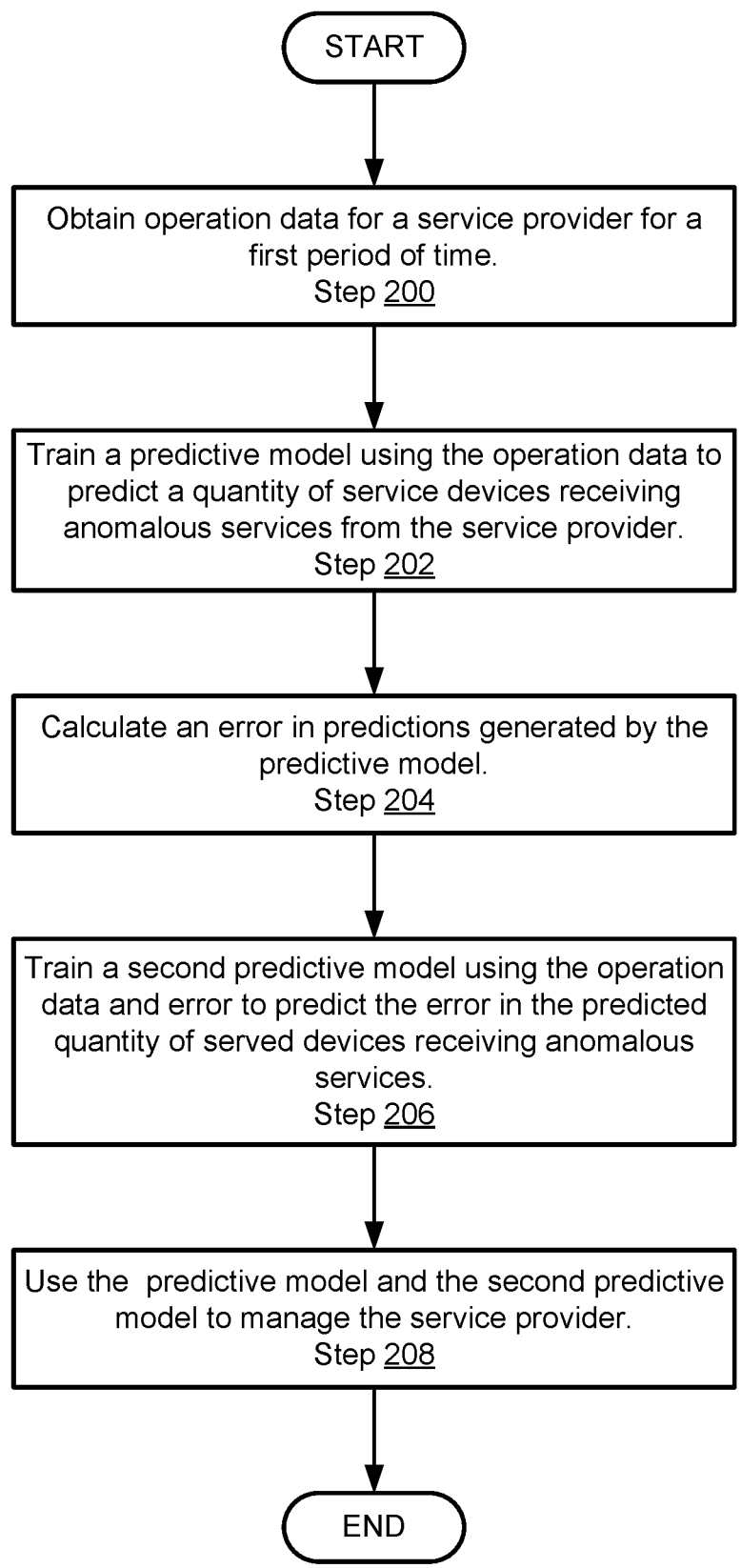
FIG. 2 shows a flowchart of a method of obtaining prediction models in accordance with one or more embodiments disclosed herein.

Networks may utilize a combination of both wired and wireless links to enable devices to communicate with one another. The quality of these links may impact the quality of communication services provided to devices served by the networks.

For example, if a link is unable to carry a predetermined quantity of data, the devices served by these links may not be able to communicate at the rates or with the latencies that the devices are expected to communicate.

Networks may be implemented using different types of network types (e.g., wired or wireless) for different use cases. For example, backbone networks may utilize wired connections/networks due to the higher reliability of these connections over time. In contrast, wireless networks that serve devices such as cell phones, laptop computers, tablet computers, etc. may be utilized due to their connectivity flexibility. Thus, networks may utilize a combination of these types of connections to provide communication services.

The services provided by networks may change over time. For wireless networks, the quality of services provided to served devices may depend on many factors in the environment in which the networks operate in addition to the operation of the device (e.g., service providers) providing the wireless networks. Thus, not all devices will receive a predetermined quality of service due to these environmental and/or operational factors.

If undesirable qualities of wireless network service are being provided due to the operation of service providers, then it may be possible to improve the qualities of the wireless network services. For example, the service providers may be restarted, an administrator may review and reconfigure the service providers, etc.

In contrast, if undesirable qualities of wireless network services are being provided due to the environment in which the service providers reside, then it may not be possible to improve the qualities of the wireless network services. For example, if a service provider is restarted it may not improve the quality of the wireless network services if the undesirable quality is due to the environment.

To manage such networks, a service manager may be utilized that is able to discriminate wireless networks that may be successfully remediated from those that are unlikely to be successfully remediated. To discriminate between these wireless networks, the service manager generates predictions regarding how many served devices are likely to receive substandard wireless communication services and an acceptable deviation from this number. If the number of devices receiving substandard wireless communication services exceeds a range defined by the predictions, then it may be determined that a service provider may be remediable. In contrast, if the number of devices receiving substandard wireless communication services falls within the range, then it may be determined that the service provider is non-remediable (e.g., the substandard quality of service is due to an environmental effect rather than operation of the service provider).

These predictions may be generated using predictive models. The predictive models may be trained using historical relationships between, for example, the number of served devices and the portion of the served devices receiving substandard communication services and/or an acceptable level of deviation from the aforementioned portion of the served devices. Such predictive models may be derived and/or generated using machine learning or other types of predictive algorithms that may operate using historical data.

If it is determined that a wireless network may be remediated, then the service manager may perform one or more actions to remediate the wireless network. These actions may include, for example, logging the condition of the wireless network, notifying administrators of the condition of the wireless network, restarting/reconfiguring a service provider that provides the wireless network, decreasing a served device load on the service provider that provides the wireless network, etc.

By doing so, a system may more efficiently marshal limited resources deployable to manage a network by avoiding deployment of resources for attempting to remediate service providers that are not remediable.

In the text that follows, a description of components of a system in accordance with embodiments disclosed herein is provided with respect to FIGS. 1.1-1.2. A description of a data structure that may be used by the system of FIG. 1.1 is provided with respect to FIG. 1.3.

Figure 3:
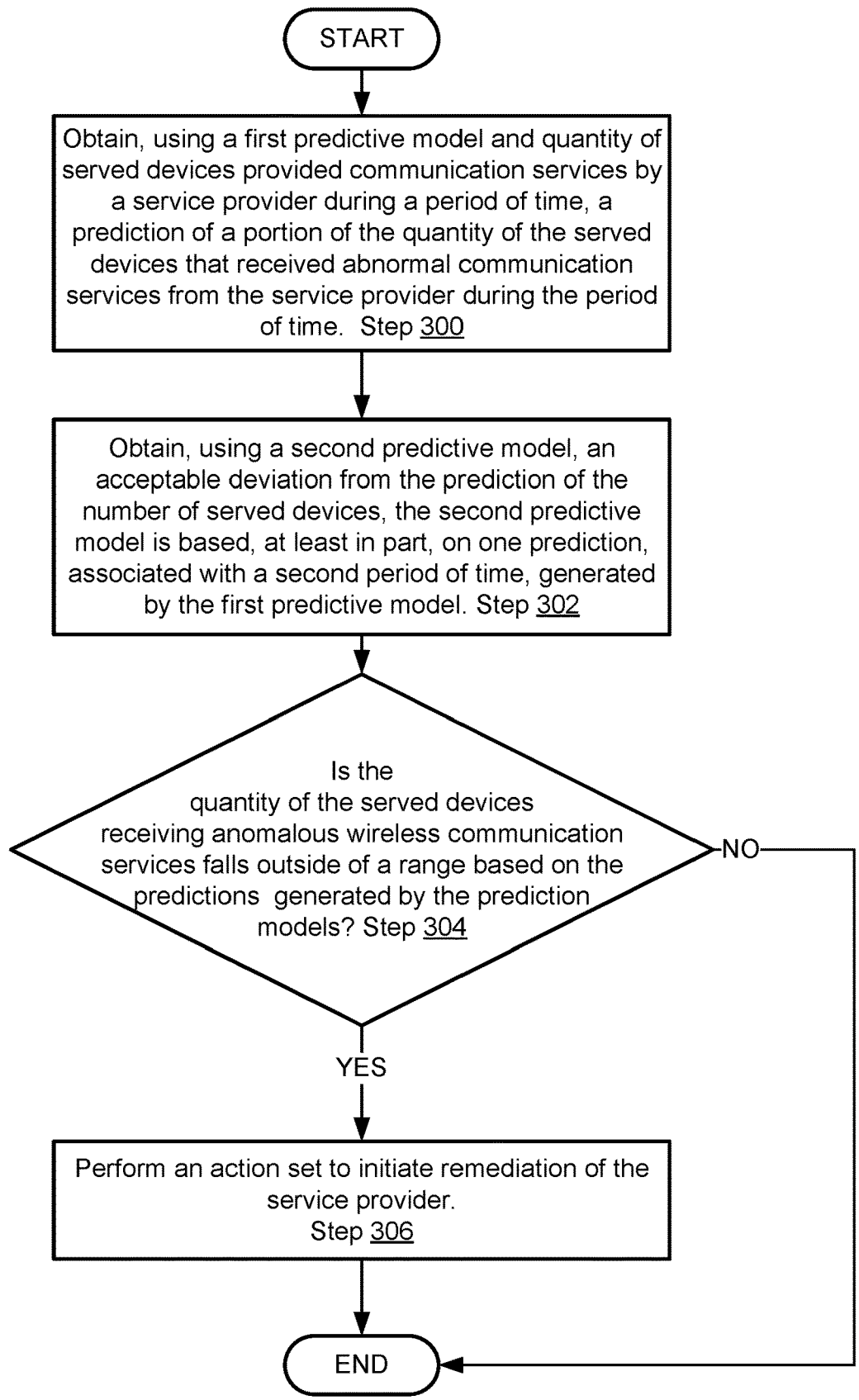
FIG. 3 shows a flowchart of a method of determining whether a wireless network is providing substandard communication services using predictive models in accordance with one or more embodiments disclosed herein.

Following the description of the data structure, a description of methods that may be performed by components of the system of FIG. 1.1 is provided with respect to FIGS. 2-3. An example system as it is used over time is provided with respect to FIGS. 4.1-4.2. Lastly, a description of a computing device that may be used to implement the system of FIG. 1.1 is provided with respect to FIG. 5.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

FIG. 1.1 shows a diagram of an example system in accordance with one or more embodiments described herein. The system may enable served devices (100) to communicate with other devices (not shown) by providing served devices (100) with communication services. The communication services may include sending and receiving packets (or other types of communication protocol compliant data structures) via wireless networks.

Served devices (100) may be implemented using any quantity and types of computing devices. For example, any of served devices (100) may be implemented using laptop computer, desktop computer, cellular telephones, tablet computers, servers, internet of thing (JOT) devices, and/or any other type of device that may need to communicate with other devices to provide their respective functionalities. Different served devices (e.g., 100A, 100N) may be implemented using similar or different types of computing devices.

Served devices (100) may be wirelessly enabled devices. For example, served devices (100) may include wireless network adapters, may be operably connected to access point or other devices that facilitate wireless communications, etc.

Served devices (100) may wirelessly communicate with other devices using any number and/or types of communication protocols. For example, served devices (100) may implement any type of wireless network protocol (e.g., IEEE 802.11 family protocols) using any type of hardware.

In one or more embodiments disclosed herein, different groups of served devices (100) wirelessly communicate with corresponding service providers (110) that facilitate broader network access. For example, service providers (110) may (i) wirelessly communicate with some of served devices (100) and (ii) be operably connected to network (120) to which any number of other devices (not shown) may be operably connected.

The served devices (100) may, using the communication services provided by service providers (110), provide any type and quantity of computer implemented services to users of the served devices (100). The computer implemented services may include, for example, database services, electronic communications services, file serving services, and/or any other type of service that may be provided, in part, through communications with other entities. If served devices (100) are unable to communicate via the provided communication services (or if the quality of communication is degraded), then the computer implemented services provided by the served devices (100) may be impaired. For example, served devices (100) may be unable to provide all, or a portion, of the computer implemented services because served devices (100) may be unable to access data (e.g., stored remotely from the served devices) necessary to provide the computer implemented services.

To provide served devices (100) with communication services, the system of FIG. 1.1 may include service providers (110). Service providers (110) may be implemented using wirelessly enabled routers, switches, and/or other types of communications devices.

Service providers (110) may include functionality to: (i) deploy wireless networks (e.g., 112A, 112N), (ii) communicate with served devices (100) via the wireless networks, (iii) collect information regarding the communication services provided to served devices (100) (e.g., connectivity information, communication bandwidth, rate at which traffic is dropped, etc.), and/or (iv) communicate with other devices (not shown) via any combination of wired and/or wireless links (e.g., via network 120). In one or more embodiments, two or more service providers may contribute to the same wireless network.

To provide the communications services, service providers (110) may: (i) obtain packets (or other communication protocol compliant data structures), (ii) determine to which entities to forward the packets (if not destined for the respective service providers), and (iii) forward the packets toward the entities (e.g., via network (120)).

To manage communications with various groups of served devices (100), service providers (110) may deploy any number of wireless networks (e.g., 112A, 112N). The wireless network may be deployed by allocating a portion of the hardware resources available to service providers (110).

For example, each of the service providers (110A, 110N) may include chipset, antennas, processors, and/or other hardware resources that limit the ability of service providers (110) to communicate with other devices. Service providers (110) may deploy networks to logically allocate its resources among the groups of served devices (e.g., allowing only certain served devices to access the respective wireless networks) and manage the communications between the service providers and respective served devices.

When the wireless networks (e.g., 112A, 112N) are deployed, the wireless networks may each have different characteristics that impact the ability of each of the wireless networks to be provided. For example, some of the wireless networks deployed by a service providers may utilize lower carrier frequencies while other wireless networks deployed by the service providers may utilize higher carrier frequencies. Consequently, the transmission loss, noise in the local environment, and other unpredictable characteristics may cause the various wireless networks to perform differently from one another and over time (e.g., by virtue of doors being closed, other devices nearby radiating different amounts of power in a carrier band, etc.). Thus, it may be challenging to determine whether the performance of a wireless network is due to the operation of a service provider or is a natural variation of the performance of the wireless network due to the environment in which the service provider resides.

In general, embodiments disclosed herein may provide systems and devices for managing the provisioning of communications services in a wireless network environment. Specifically, embodiments disclosed herein may enable the system of FIG. 1.1 to discriminate when a wireless network is not performing as desired due to environmental conditions from when a wireless network is not performing as desired due to conditions that may be remediated.

To do so, the system of FIG. 1.1 may include service manager (130). Service manager (130) may monitor the operation of service providers (110) to ascertain when the performance of a wireless network may be remediable. To do so, service manager (130) may train predictive models usable to determine whether undesirable performance is due to a remediable cause (versus causes that are unlikely to be remediable).

If a wireless network is underperforming due to a remediable cause, then service manager (130) may initiate one or more actions that may remediate the performance of the wireless network. For example, service manager (130) may restart a service provider, take down and bring back up a wireless network, may log the poor performance of the wireless network, may notify an administrator of the poor performing wireless network, and/or may perform other actions.

By identifying whether underperformance of a wireless network is remedial, the system of FIG. 1.1 may be better able to marshal limited resources for management of the network. Further, as the number of wireless networks and/or the served devices increases, misidentification of underperforming wireless networks that cannot be remediated may become problematic due to the limited time which administrators may have available for further investigation.

Any of the components of FIG. 1.1 may be operably connected by any combination and/or number of wired and/or wireless connections (e.g., 112A, 112N, 120).

Any of the devices of FIG. 1.1 may be implemented using computing devices. The computing devices may include, for example, mobile phones, tablet computers, laptop computers, desktop computers, servers, switches, and/or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing devices to perform the functions described in this application and/or all, or a portion, of the methods illustrated in FIGS. 2-3. The devices of FIG. 1.1 may be implemented using other types of computing devices without departing from the embodiments disclosed herein. For additional details regarding computing devices, refer to FIG. 5.

The devices of FIG. 1.1 may be implemented using logical devices without departing from the embodiments disclosed herein. For example, the devices of FIG. 1.1 may be implemented using virtual machines (or other types of logical entities) that utilize computing resources (e.g., provided by hardware devices) of any number of physical computing devices to provide their respective functionalities. Thus, a logical entity may be an entity that, for example, shares various hardware devices when providing its functionality. The devices of FIG. 1.1 may be implemented using other types of logical devices without departing from the embodiments disclosed herein.

While the system of FIG. 1.1 has been illustrated and described as including a limited number of specific components, a system in accordance with embodiments disclosed herein may include additional, fewer, and/or different components than those illustrated and described.

To further clarify aspects of service managers, a diagram of service manager (130) is provided in FIG. 1.2. While the system of FIG. 1.1 is illustrated as only including a single service manager, a system in accordance with embodiments of the disclosure may include any number of service managers that may separately or in cooperation with one another manage the operation of any number of service providers.

FIG. 1.2 shows a diagram of service manager (130) in accordance with one or more embodiments described herein. Service manager (130) may facilitate network communications by managing the operation of any number of service providers.

To manage the communication services provided by the service provider, service manager (130) may include a service provider manager (e.g., 132) that: (i) obtains information regarding the wireless networks used by the service providers to provide the communication services, (ii) uses the obtained information to train predictive models that are able to infer whether the performance of a wireless network may be remediated, and (iii) performs actions sets, based on inferences generated by the predictive models, to remediate or otherwise manage the operation of the service providers. Service manager (130) may perform other functions in addition to those listed above. By doing so, the system of FIG. 1.1 may be better able to marshal limited resources for managing the communication services it provides in order to improve the communication quality experienced by the served devices.

The information regarding the wireless networks may include the performance of the wireless networks over time. For example, the information may include: (i) the number of served devices of the wireless network over time, (ii) the number of served devices receiving a quality of service below that expected for the wireless network, (iii) the number of served devices receiving a quality of service meeting that expected for the wireless network, (iv) identifiers of served devices that utilize the wireless networks, and/or (v) any other information. The information may be collected on a granular level such as on a per wireless network basis (e.g., each wireless network having a separate service set identifier). The aforementioned information may be collected over multiple consecutive or non-consecutive time periods. The collected information may be stored in service provider operation data repository (136).

Service provider manager (132) may use the collected information to obtain predictive models. The predictive models may be usable to infer whether a wireless network is operating normally (e.g., not remediable) but in a desirable manner or abnormally (e.g., in a remediable manner) in an undesirable manner.

The predictive models may be obtained by: (i) forming relationships using the collected information, (ii) training machine learning or other predictive models based on the relationships, (iii) generating predictions using the trained models, (iv) calculating errors levels (e.g., that devise acceptable levels of deviation) in the predictions, (v) generating additional relationships using the calculated errors levels, and (vi) training machine learning or other predictive models based on the additional relationships. By doing so, sets of predictive models may be usable to predict whether a wireless network should be remediated. In one or more embodiments, for a given service provider, there may be a predictive model (in the set of predictive models) for each combination of location, service set identifier, and communication band utilized by the service provider. The location may correspond to a geographic location (e.g., city, regions, country) and/or location where access points for the service provider are deployed (e.g., building, floor, etc.).

For example, a set of predictive models may include a first predictive model that takes, as input, a number of served devices of a wireless network and corresponding served device properties and generates a prediction of a portion of the served devices that are likely to be receiving undesirable communication services from the wireless network. In one or more embodiments, the served device properties may include, but are not limited to: operating system executing on the served device, vendor name (e.g., name of the vendor or manufacturer of the wireless and/or WiFi chipset), and wireless protocols supported by the served device.

The set of predictive models may also include a second predictive model that takes as input the number of served devices of the wireless network and generates a second inference of an acceptable level of deviation from the prediction generated by the first predictive model. If a number of served devices actually receiving substandard communication services from the wireless network exceeds a range defined by the first prediction and second prediction, then service provider manager (132) determines that the wireless network is operating in a manner that may be improved by remediating it (i.e., taking one or more actions to improve the operation of the wireless network). In contrast, if the number of served devices actually receiving substandard communication services from the wireless network falls within the range defined by the first prediction and second prediction then service provider manager (132) determines that no action(s) are required to be performed at this time.

Service provider manager (132) may store the predictive models in the predictive model repository (138). Additionally, service provider manager (132) may distribute the predictive models to service providers implementing the wireless networks thereby allowing the service providers to make determinations using the models.

Based on the determinations made using the models in the predictive model repository, service provider manager (132) may perform one or more actions. The actions may include any type and/or quantity of actions. The actions may, for determinations that wireless networks may be remediated, attempt to remediate the wireless networks. For determinations that the wireless networks may not be remediated, the actions may cause information regarding the wireless networks to be logged for further analysis by administrators or other persons and/or for other purposes.

Service provider manager (132) may determine which actions to perform using abnormality repository (140). Abnormality repository (140) may specify actions to be performed in response to determinations that a wireless network may be remediated. The actions may be determined by, for example, matching an identity of a service provider to one or more actions specified by abnormality repository (140). Abnormality repository (140) may take, as a key, an identity of a service provider (and/or other information). The key may be matched to entries of a database or other type of data structure that specify actions and/or information regarding the actions to be performed by service manager (130) and/or other devices (e.g., a service provider).

Previous determinations and/or information regarding the determinations (e.g., conditions under which the determinations occurred) may also be stored in the abnormality repository (140). For example, a log of the determinations may be stored in the abnormality repository.

In one or more embodiments disclosed herein, service provider manager (132) is implemented using a hardware device including circuitry. Service provider manager (132) may include, for example, a digital signal processor, a field programmable gate array, and/or an application specific integrated circuit. The circuitry of the hardware devices may be adapted to provide the functionality of service provider manager (132). Service provider manager (132) may be implemented using other types of hardware devices without departing from embodiments disclosed herein.

In one or more embodiments disclosed herein, service provider manager (132) is implemented using computing code stored on a persistent storage that when executed on a processor causes the processor to perform the functionality of service provider manager (132). The processor may be a hardware processor including circuitry such as, for example, a central processing unit or a microcontroller. The processor may be other types of hardware devices for processing digital information without departing from the embodiments disclosed herein.

Service provider manager (132) may perform all, or a portion, of the methods illustrated in FIGS. 2-3 as part of providing its functionality.

When performing its functionality, service provider manager (132) may utilize data structures stored in storage (134).

In one or more embodiments disclosed herein, storage (134) is implemented using devices that provide data storage services (e.g., storing data and providing copies of previously stored data). The devices that provide data storage services may include hardware devices and/or logical devices. For example, storage (134) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, storage (134) may include a memory device (e.g., a dual in line memory device) in which data is stored and from which copies of previously stored data are provided. In another example, storage (134) may include a persistent storage device (e.g., a solid state disk drive) in which data is stored and from which copies of previously stored data is provided. In a still further example, storage (134) may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

Storage (134) may store data structures including service provider operation data repository (136), predictive model repository (138), and/or abnormality repository (140).

Service provider operation data repository (136), predictive model repository (138), and/or abnormality repository (140) may be implemented using one or more data structures. The data structure may include, for example, lists, tables, linked lists, databases, unstructured data, and/or other types of data structures. While these data structures have been described as including a limited quantity of specific information, any of the data structures may include additional, different, and/or less information without departing from the disclosure. Further, while illustrated as being stored in storage (134), any of the aforementioned data structures may be stored in other locations, may be spanned across any number of devices, and/or may be combined with any number of other data structures. For additional details regarding predictive model repository (138), refer to FIG. 1.3.

While service manager (130) has been illustrated in FIG. 1.2 as including a limited number of specific components, a service manager in accordance with embodiments disclosed herein may include additional, fewer, and/or different components.

Turning to FIG. 1.3, FIG. 1.3 shows a diagram of predictive model repository (138) in accordance with embodiments disclosed herein. Predictive model repository (138) may include any number of predictive models usable to infer whether wireless networks may be remediated (e.g., operating in an abnormal manner which may be correctable).

The predictive models may include quantity predictive models (142) and expected error predictive models (144). Predictive models repository (138) may include any number of such models and/or other types of models.

Quantity predictive models (142) may be used to predict, based on a quantity of served devices of a network at a given point in time (e.g., at time T=5) and/or over a range of time (e.g., time range T=1 to T=3, time range T=2 to T=5, etc.) and the served device properties (described above), a quantity of served devices that are likely to be experiencing undesirable performance by the wireless network in the future (e.g., after the time and/or time ranges used for the input to the quantitative predictive modes). For example, the quantity predictive models (142) may take, as input, the quantity of served devices of the network and output a proportion, number, or other type of quantification of the number of served devices that are likely to experience undesirable wireless network performance.

Expected error predictive models (144) may be used to infer, based on a quantity of served devices of a network, a likely level of variation of an inferred number of served devices that are likely to experience undesirable wireless network performance that does not indicate that the wireless network is remediable. For example, the expected error predictive models (144) may take, as input, the quantity of served devices of the wireless network and output a proportion, number, range, or other type of quantification of a variation from the inferred number of served devices that are likely to experience undesirable wireless network performance that does not indicate that the wireless network is remediable.

The range (or other quantification) specified by an expected error predictive model and number of served device of a wireless network receiving substandard performance inferred using a quantity predictive model may be used to ascertain whether a wireless network is remediable. To do so, the actual number of served devices receiving substandard wireless network performance may be compared to the range defined by the inferences made using the predictive models. If the actual number falls within the range, then no action may be taken. In contrast, if the actual number falls outside of the range, then one or more actions should be taken to remediate the wireless network.

For example, consider a scenario where a quantity of predictive models predicts that seven served devices are likely to receive substandard wireless networking services and an expected error predictive model predicts that this quantity may vary by plus or minus two served devices (e.g., an acceptable deviation). If the number of served devices actually receiving substandard wireless networking services from the wireless network exceeds nine served devices (e.g., 7+2), then it is determined that the wireless network should be remediated.

The predictive models included in the predictive model repository (138) may be time dependent. For example, each of the models may be associated with different periods of times during the days, days of the week, and/or other metrics. Thus, some of the predictive models may only be usable during the associated periods of time. Consequently, the predictive models may also be keyed to periods of time in addition to certain wireless networks.

While the predictive model repository (138) is illustrated in FIG. 1.3 as including a limited quantity of specific information, a predictive model repository in accordance with embodiments of the disclosure may include additional, less, and/or different information without departing from embodiments disclosed herein.

As discussed above, the system of FIG. 1.1 may provide communication services using wireless networks. FIGS. 2-3 show diagrams of methods that may be performed by the system of FIG. 1.1 to manage the devices that provide the wireless networks.

FIG. 2 shows a flowchart describing a method for obtaining predictive models in accordance with one or more embodiments disclosed herein. The method may be performed by, for example, a service manager (e.g., 130, FIG. 1.2). Other entities may perform the method of FIG. 2 without departing from embodiments disclosed herein.

While the various steps in the flowchart shown in FIG. 2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 200, operation data for a service provider for a first period of time is obtained. The operation data may be obtained from a service report generated by the service provider. The service report may be a data structure that indicates the number of devices served during the first period of time and the quality of services provided to the respective served devices during the first period of time. This information may be used to determine the number of served devices utilizing respective wireless networks provided by the service provider and a portion of the served devices that received substandard wireless network services from the respective wireless networks.

The service provider may generate the service report in accordance with a schedule, upon request from the service manager, or via other mechanisms. The service report may be provided to the service manager using any command and control scheme without departing from embodiments disclosed herein.

Table 1, below, illustrates a non-limiting example of a service report. The service report may specify the number of served devices by a wireless network and the number of served devices impacted by substandard service. In this example, the number of served devices may be 15 while the number of impacted served devices may be 3.

TABLE 1

Example service report.

| Number of Served Device | Number of Impacted Served Devices |
|---|---|
| 15 | 3 |

In step 202, a predictive model is trained using the operation data and, optionally, corresponding served device properties. The predictive model may be able to predict a quantity of served devices (e.g., on a per wireless network basis) receiving anomalous (e.g., substandard) wireless networking services from the services provider (e.g., on a per wireless network basis).

The predictive model may be obtained by training a machine learning model using the data included in the service report obtained in step 200. As used herein, training refers to a process of determining the parameters of a predictive model (e.g., a data structure) in a manner that makes it likely to be able to predict a relationship between an input and output even when the data used to train the predictive model does not explicitly cover all cases for the relationship.

The predictive model may be obtained by using any type of learning algorithm (e.g., machine learning using artificial neural networks, decision trees, support-vector machines, regression analysis, Bayesian networks, genetic algorithms, etc.). For example, the predictive model may be obtained by using a random forest algorithm. The predictive model may be obtained using other algorithms without departing from embodiments disclosed herein.

The anomalous services may correspond to substandard wireless network services such as a communications rate that falls below a predetermined level, a drop rate of communications exceeding a predetermined level, a level of channel congestion exceeding a predetermined level, and/or other quantitative characterizations of the wireless network services received by served devices.

In step 204, the error in the predictions generated by the first predictive model is calculated. The error in the predictions may be calculated by generating a prediction and comparing it to the actual number of served devices receiving substandard services.

Table 2, below, shows an example of such a calculation. Using the predictive model, the predicted number of impacted served devices (which corresponds to the number of served devices) is predicted based only on the number of served devices. The error is then calculated by identifying the difference between the predicted number of impacted served devices (i.e., 1) and the actual number of impacted served devices (i.e., 3). In this example, the error is 2.

TABLE 2

Example error calculation.

| Number of Served Devices | Number of Impacted Served Devices | Predicted number of impacted Served Devices | Error |
|---|---|---|---|
| 15 | 3 | 1 | 2 |

The process illustrated in Table 2 may be repeated a number of times (e.g., for different numbers of served devices) to obtain a relationship between numbers of served devices and the error. As will be discussed below, a second predictive model may be generated to predict this relationship.

In step 206, a second predictive model is trained using the operation data and the error (e.g., calculated in step 204). The second predictive model may infer the error in the predicted quantity of served devices receiving anomalous services.

The second predictive model may be trained similarly to that discussed with respect to step 202. However, the relationship between the number of served devices and the error may be used as the training data (rather than the number of served devices and the number of impacted served devices). Thus, the second predictive model may be trained, in part, using the output of the first predictive model (e.g., which is used to calculate the error).

The output of the second predictive model (or a value derived from the output of the second predictive model, e.g., a multiple of the output of the second predictive model) may be referred to as the acceptable level of deviation from the predicted number of impacted served devices that does not indicate that the wireless network is remediable. Rather, so long as the actual number of served devices falls within the range defined by the predicted number of impacted served devices and the error (e.g., between 0 and the predicted number of impacted served devices + the error), then the wireless network may be considered unable to be remediated. In other words, the poor performance or other anomalous behavior may be attributed to the environment or other factors that cannot be addressed by remediating the wireless network (e.g., by restarting the service provider or performing other actions).

In step 208, the first predictive model and the second predictive model are used to manage the service provider. The predictive models may be used to manage the service provider by inferring whether the wireless network services provided by the service provider may be remediated.

The service provider may be managed by generating predictions of the number of impacted served devices and the error in those predictions (e.g., acceptable levels of deviation). The predictions may be generated by obtaining data from the service provider (e.g., service reports) or by sending the predictions models to the service provider (or other entities) to use to generate the predictions.

The method may end following step 208.

The predictive models obtained via the method illustrated in FIG. 2 may be utilized to manage the system of FIG. 1.1.

Turning to FIG. 3, FIG. 3 shows a flowchart describing a method for managing wireless networks using predictive models in accordance with one or more embodiments disclosed herein. The method may be performed by, for example, a service manager (e.g., 130, FIG. 1.2). Other entities may perform the method of FIG. 3 without departing from embodiments disclosed herein.

While the various steps in the flowchart shown in FIG. 3 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 300, a prediction of a portion of the quantity of the served devices that received abnormal communication services from a service provider during a first period of time is obtained using a first predictive model and the quantity of the served devices that are provided communication services by the service provider. The prediction may be obtained by using, as input to the first predictive model, the quantity of the served devices that are provided communication services by the service provider. The first predictive model may generate, as output, the prediction.

The first predictive model may be a quantity predictive model as discussed with respect to FIG. 1.3. The input may be obtained from a service report generated by the service provider for the first period of time.

In step 302, an acceptable deviation from the prediction generated by the first predictive model may be obtained using a second predictive model. The second predictive model is trained, at least in part, using one or more predictions, generated by the first predictive model. The acceptable deviation may be obtained by using, as input to the second predictive model, the quantity of served devices and served device properties. The second predictive model may generate, as output, the acceptable deviation.

The second predictive model may be an expected error predictive model as discussed with respect to FIG. 1.3. The input may be obtained from a service report generated by the service provider.

In step 304, it is determined whether the quantity of the served devices actually receiving anomalous wireless communications services falls outside of a range based on the predictions generated by the first predictive model and the second predictive model. The determination may be made by adding the acceptable deviation generated by the second predictive model to the predicted quantity of devices generated by the first predictive model to identify an extent of the range (e.g., that extends from 0 to the identified extent).

For example, if the predicted quantity of devices is ten and the acceptable deviation is four, then the range extends from zero to fourteen.

If the quantity of devices actually receiving anomalous wireless communication services (e.g., based on one or more standards) falls outside of the range, then the method may proceed to step 306. In other words, the service manager may infer that it is likely that the wireless network may be remediated to eliminate the anomalous wireless communication services. Otherwise, the method may end following step 304. In other words, the service manager may infer that remediating the wireless network may not provide any benefit to the served devices and may elect to not take any remediation action. However, the service manager may still log or otherwise document the performance of the wireless network.

In step 306, performance of an action set is initiated to remediate the service provider. The action set may include any number of actions specified by an abnormality repository (140). The actions may include any type and quantity of actions.

For example, the actions set may include one or more of: (i) notifying an administrator, wherein the notification may include zero, one, or more recommendations that the administrator may take to remediate (or attempt to remediate) the wireless network, (ii) restarting the wireless network and/or service provider that provides the wireless network, (iii) modifying the operation of the service provider (e.g., by limiting the number of served devices that it may serve), (iv) migrating some of the served devices to other wireless networks, etc. Other actions may be performed without departing from the disclosure.

The method may end following step 306.

Using the method illustrated in FIG. 3, a system in accordance with embodiments disclosed herein may manage wireless networks in a manner that is more likely to efficiently marshal limited resources to those wireless networks that may be improved (e.g., provide wireless network services in accordance with a standard).

To further clarify embodiments disclosed herein, a non-limiting example in accordance with embodiments is provided in FIGS. 4.1-4.2. FIGS. 4.1-4.2 show a system similar to that illustrated in FIG. 1.1. Operable connections between components of the system are illustrated using solid lines. For the sake of brevity, only a limited number of components of the system of FIG. 1.1 is illustrated in FIGS. 4.1 and 4.2.

EXAMPLE

Consider a scenario as illustrated in FIG. 4.1 in which, during the day, three people use laptop computers at their work to perform their respective jobs. During the day, most doors and other obstructions within a building in which the people work are open thereby enabling wireless signals to better travel within an environment.

To perform their respective jobs, each of the laptops (e.g., served devices 400, 402, 404) may need to access the Internet and other network locations. To provide this functionality, served devices (400, 402, 404) may be operably connected to service provider (410) via wireless network (412). Consequently, the ability of the people to perform their job functions may depend on the wireless network services provided by service provider (410) via wireless network (412).

To manage service provider (410), service manager (430), operably connected to service provider (410) via network (420), generates multiple predictive models that correspond to different times of the day. For example, service manager (430) generates a first set of predictive models using training data taken during the day and a second set of predictive models during using training data taken during the night (e.g., to model different conditions present during the day and the night).

During the day, second served device (402) begins to have intermittent issues (e.g., anomalous wireless communication services) communicating with the wireless network (412). To ascertain whether service provider (410) should be remediated, service manager (430) uses the first set of predictive models to predict whether the intermittent issues could be reduced by remediating service provider (410).

To do so, service manager (430) requests the number of served devices (i.e., 5) via wireless network (412). Service manager (430) uses the number of served devices as input to two predictive models of the first set of predictive models. The predictive models indicate that it is likely that one served device will receive anomalous wireless network services and that the acceptable deviation is one. Consequently, service manager (430) determines that service provider (410) is not remediable because the number of served devices receiving anomalous wireless network services (i.e., 1 served device) falls within the range (i.e., 0-2) that indicates that the service provider (410) does not need to be remediated.

Turning to FIG. 4.2, as time passes into the evening, one of the people leaves which causes the third served device to disconnect from the wireless network (412).

As the remaining people work into the night, service provider (410) is subject to a power spike that places wireless network (412) into an error state that does not allow any served devices to communicate using it.

In response, service manager (430) uses the number of served devices (i.e., 2) as input to two predictive models of the second set of predictive models. The predictive models indicate that it is likely that zero served devices will receive anomalous wireless network services and that the acceptable deviation is one. Consequently, service manager (430) determines that service provider (410) is remediable because the number of served devices receiving anomalous wireless network services (i.e., 2 served devices) falls outside the range (i.e., 0-1), which indicates that the service provider (410) may be remediated.

In response to this determination, service manager (430) logs the event, notifies an administrator, and initiates a restart of service provider (410). After service provider (410) restarts, served devices (400, 402) are able to connect and send data via the network.

End of Example

Using the processes illustrated with respect to FIGS. 4.1-4.2, services providers that may benefit from remediation may be discriminated from service providers that are unlikely to benefit from remediation. For example, had the system of FIG. 4.1 attempted to remediate service provider (410) during the day, no benefit would be obtained because the undesirable performance was not due to remedial operation of service provider (410).

Figure 5:
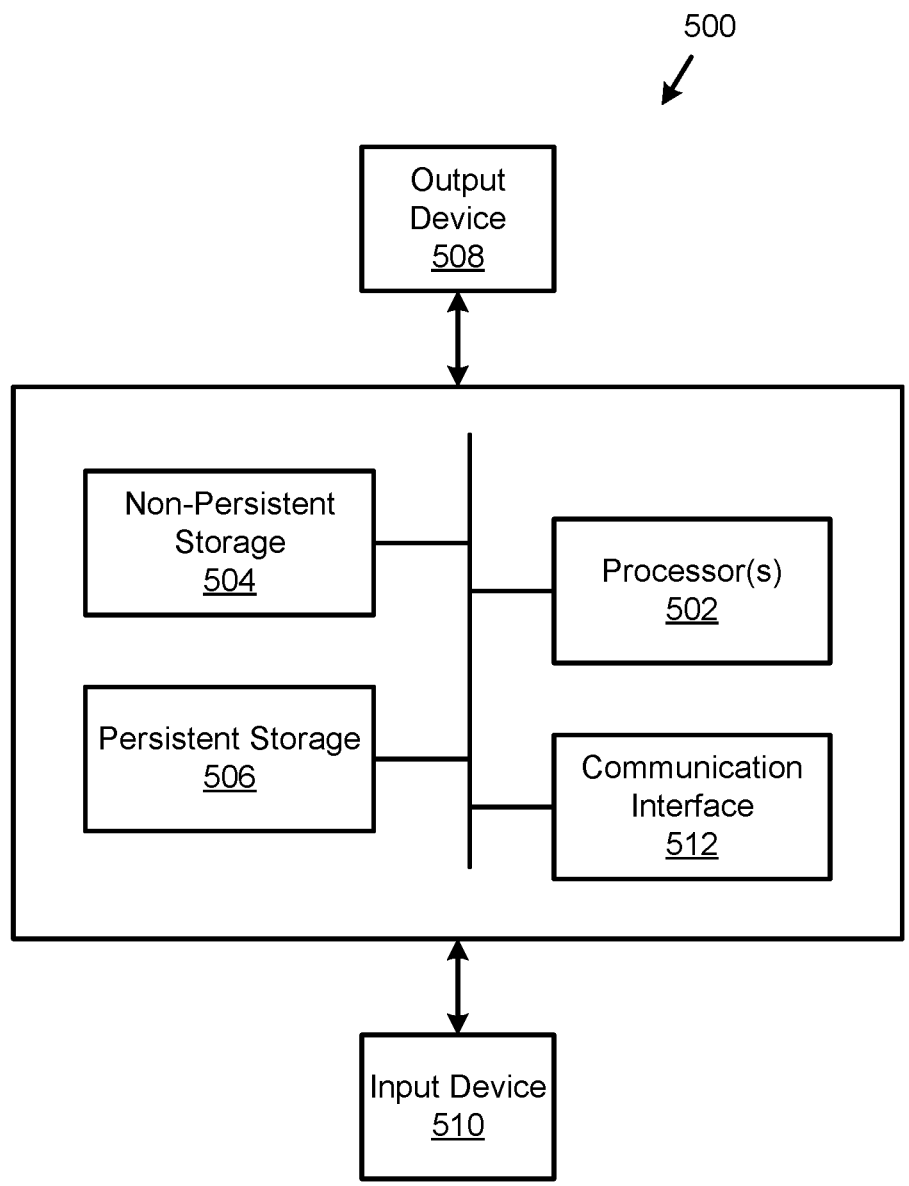
FIG. 5 shows a diagram of a computing device in accordance with one or more embodiments disclosed herein.

As discussed above, embodiments disclosed herein may be implemented using computing devices. FIG. 5 shows a diagram of a computing device in accordance with one or more embodiments disclosed herein. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment disclosed herein, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

While embodiments described herein have been described with respect to a limited number of examples, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A system to manage communication services provided by a service provider, comprising:
   at least one processor; and
   at least one non-transitory machine-readable medium storing computer-executable instructions that when executed by the at least one processor cause the system to:
   obtain, using a first predictive model and a quantity of served devices to which the service provider provides communication services during a period of time, a first prediction of a portion of the quantity of the served devices that are to receive substandard communication services from the service provider during the period of time;
   obtain, using a second predictive model, an acceptable deviation from the first prediction of the portion of served devices, wherein the second predictive model is based, at least in part, a second prediction associated with a second period of time generated by the first predictive model;
   make a determination that a quantity of the served devices that received substandard communication services from the service provider during the period of time is outside of a range based on:
      the first prediction of the portion of the quantity of served devices, and
      the acceptable deviation; and
   based on the determination, perform an action set to initiate remediation of the service provider.

2. The system of claim 1, further causing the system to:
   obtain a service report for the service provider for the second period of time, the service report indicating:
      a second quantity of served devices that received the communication services during the second period of time, and
      a portion of the second quantity of the served devices that received substandard communication services during the second period of time;
   generate the first predictive model using at least the service report;
   generate the second prediction associated with the second period of time using the first predictive model and the second quantity of served devices;

identify a difference between the second prediction associated with the second period of time and the portion of the second quantity of the served devices; and generate the second predictive model using the service report and the difference.

3. The system of claim 2, wherein the first predictive model is generated by training a machine learning model using the service report to predict the portion of the second quantity of the served devices based on the second quantity of the served devices.

4. The system of claim 2, wherein the second predictive model is generated by training a machine learning model using the service report and the difference to predict an error based on the second quantity of the served devices.

5. The system of claim 2, wherein the generating the first predictive model using at least the service report further comprises using a served device property for at least one of the served devices.

6. The system of claim 2, wherein the second period of time is prior to the first period of time.

7. The system of claim 1, further causing the system to at least one of:
obtain operation data for the service provider during the period of time;
identify an undesired operation of the service provider based on the operation data; and
initiate modification of operation of the service provider to remediate the undesired operation.

8. The system of claim 1, wherein the communication services comprise:
wireless communications between the service provider and the served devices,
wherein the first predictive model is associated with a single service set identifier and communication band supported by the service provider.

9. The system of claim 6, wherein the first predictive model is part of a predictive model set that comprises separate predictive models for each combination of location, service set identifier, and communication band utilized by the service provider.

10. The system of claim 1, wherein the action set comprises issuing a notification to an administrator, wherein the notification comprises at least one recommendation for the administrator to perform to attempt to remediate the communication services.

11. A method of managing communication services provided by a service provider, comprising:
obtaining, using a first predictive model and a quantity of served devices to which the service provider provides communication services during a period of time, a first prediction of a portion of the quantity of the served devices that received substandard communication services from the service provider during the period of time;
obtaining, using a second predictive model, an acceptable deviation from the first prediction of the portion of served devices, wherein the second predictive model is based, at least in part, a second prediction associated with a second period of time generated by the first predictive model;
making a determination that a quantity of the served devices that received substandard communication services from the service provider during the period of time is outside of a range based on:
the first prediction of the portion of the quantity of served devices, and the acceptable deviation; and based on the determination, performing an action set to initiate remediation of the service provider.

12. The method of claim 11, further comprising:
obtaining a service report for the service provider for the second period of time, the service report indicating:
a second quantity of served devices that received the communication services during the second period of time, and
a portion of the second quantity of the served devices that received substandard communication services during the second period of time;
generating the first predictive model using the service report;
generating the second prediction using the first predictive model and the second quantity of served devices;
identifying a difference between the second prediction and the portion of the second quantity of the served devices; and
generating the second predictive model using the service report and the difference.

13. The method of claim 12, wherein the first predictive model is generated by training a machine learning model using the service report to predict the portion of the second quantity of the served devices based on the second quantity of the served devices.

14. The method of claim 12, wherein the second predictive model is generated by training a machine learning model using the service report and the difference to predict an error based on the second quantity of the device.

15. The method of claim 11, wherein the action set comprises:
obtaining operation data for the service provider during the period of time;
identifying an undesired operation of the service provider based on the operation data; and
initiating modification of operation of the service provider to remediate the undesired operation.

16. The method of claim 11, wherein the communication services comprise:
wireless communications between the service provider and the served devices,
wherein the first predictive model is associated with a single service set identifier and communication band supported by the service provider.

17. The method of claim 16, wherein the first predictive model is part of a predictive model set that comprises separate predictive models for each service set identifier and communication band utilized by the service provider.

18. A non-transitory computer readable medium comprising computer readable program code, which when executed by a computer processor enables the computer processor to perform a method for managing communication services provided by a service provider, the method comprising:
obtaining, using a first predictive model and quantity of served devices to which the service provider provides communication services during a period of time, a first prediction of a portion of the quantity of the served devices that received substandard communication services from the service provider during the period of time;
obtaining, using a second predictive model, an acceptable deviation from the first prediction of the portion of served devices, wherein the second predictive model is based, at least in part, on a second prediction associated with a second period of time generated by the first predictive model;

making a determination that a quantity of the served devices that received substandard communication services from the service provider during the period of time is outside of a range based on:
  the first prediction of the portion of the quantity of served devices, and the acceptable deviation; and
  based on the determination, performing an action set to initiate remediation of the service provider.

19. The non-transitory computer readable medium of claim 18, wherein the method further comprises:
  obtaining a service report for the service provider for the second period of time, the service report indicating:
    a second quantity of served devices that received the communication services during the second period of time, and
    a portion of the second quantity of the served devices that received substandard communication services during the second period of time;
  generating the first predictive model using the service report;
  generating the second prediction using the first predictive model and the second quantity of served devices;
  identifying a difference between the second prediction and the portion of the second quantity of the served devices; and
  generating the second predictive model using the service report and the difference.

20. The non-transitory computer readable medium of claim 19, wherein the first predictive model is generated by training a machine learning model using the service report to predict the portion of the second quantity of the served devices based on the second quantity of the served devices.

* * * * *